(No Model.)

J. B. ROOT.
PIPE COUPLING.

No. 245,018. Patented Aug. 2, 1881.

Witnesses:
Henry Eidling
Robt H. Duncan

Inventor:
John B Root

UNITED STATES PATENT OFFICE.

JOHN B. ROOT, OF PORT CHESTER, NEW YORK.

PIPE-COUPLING.

SPECIFICATION forming part of Letters Patent No. 245,018, dated August 2, 1881.

Application filed November 13, 1880. (No model.)

*To all whom it may concern:*

Be it known that I, JOHN B. ROOT, of Port Chester, in the county of Westchester and State of New York, have invented a new and useful Improvement in Pipe-Couplings, of which the following is a specification.

This invention relates to improvements in expansible couplings for uniting lengths or sections of pipes or tubes; and it consists in straps of metal attached externally to the thimble and about midway of its length, and terminating upon each side of the longitudinal opening of the thimble in projections, which form a seat for the expanding wedge or key, in combination with an external projection nearly opposite the longitudinal opening, and of substantially the same width as the straps, whereby the ends of the pipe-sections, by abutting against the edges of the straps and the projection, are aligned with each other; also, the combination, with the expanding key or wedge of a pipe-coupling, of a suitable packing to seal the opening between the longitudinal edges of the thimble or ring, all substantially as hereinafter more fully described and shown.

Figure 1:
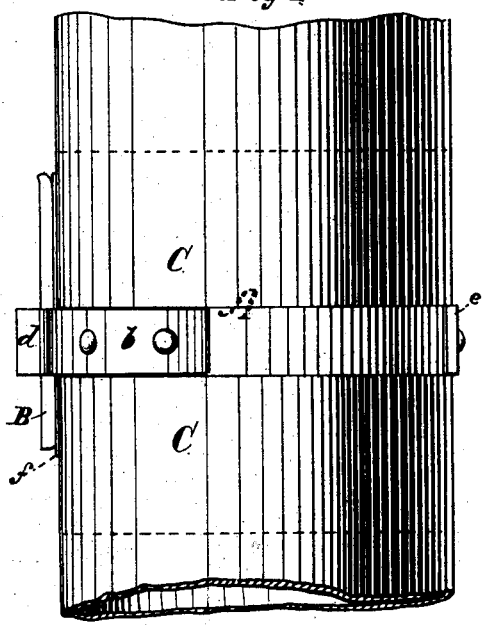
Figure 2:
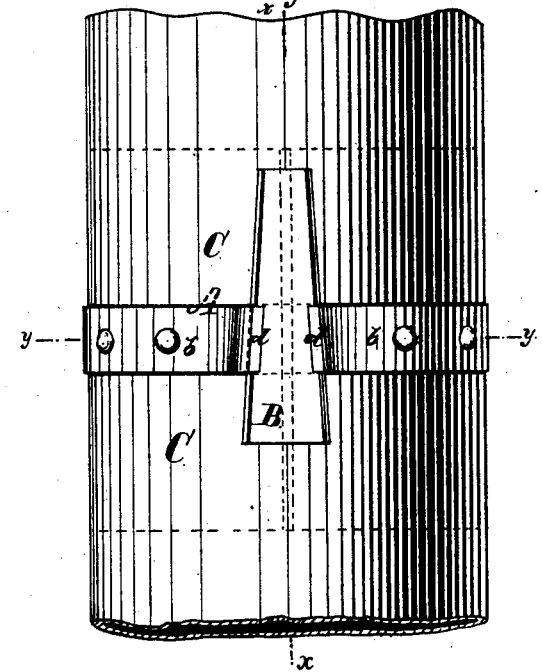
Figure 3:
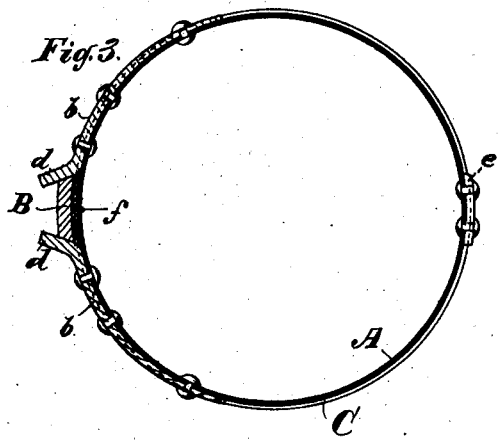
Figure 4:
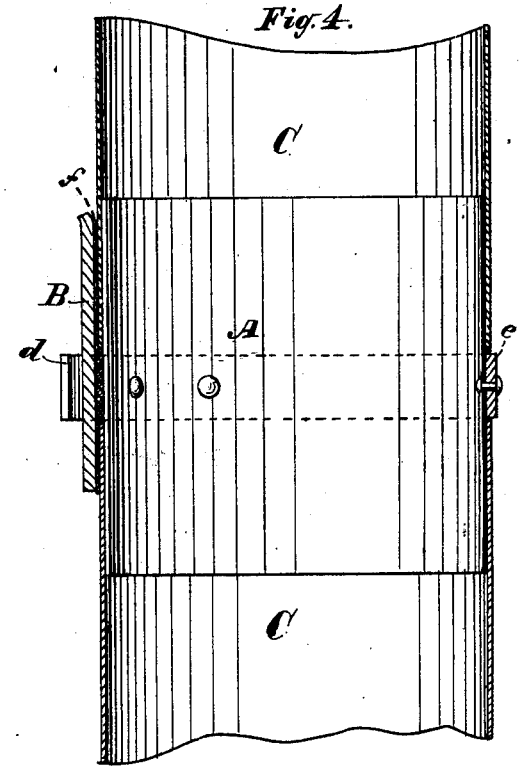
Figure 5:
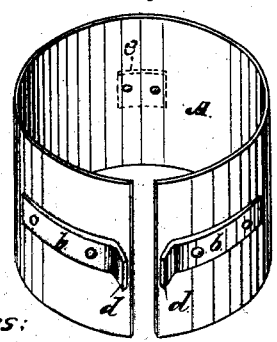

The invention is illustrated in the accompanying drawings, in which Figures 1 and 2 are side elevations of lengths or sections of pipe united by an expansible coupling thimble or ring. Fig. 3 is a cross-section through the line *y y* of Fig. 2. Fig. 4 is a longitudinal section through the line *x x* of Fig. 2; and Fig. 5 is a view, in perspective, of an expansible coupling thimble or ring provided with lugs or projections for seating an expanding key or wedge.

In the drawings, A represents a thimble or ring of tubular form, and adapted to be inserted within the ends of sections of pipe or tubing. This thimble is divided longitudinally, or its longitudinal edges are not united, as the case may be, so that it is free to be expanded or contracted within certain limits—that is, its free edges can be brought together, and its diameter thereby decreased, or they can be forced asunder, and its diameter increased. It is constructed of metal or other suitable material of any desired kind and thickness, provided only it is capable of being expanded by the proper means, the thickness of the thimble or ring being largely determined by the thickness of the pipe to which the coupling is applied. Near the longitudinal center of this thimble are straps *b b*, secured in place by rivets, screw-bolts, or other proper devices. These straps terminate near the longitudinal edges of the thimble in projections *d d*, so shaped and inclined in relation to each other and the surface of the thimble as to hold the key or wedge B, which may be used to force the edges asunder, and thus increase its diameter.

*e* is a piece projecting from the surface of the thimble, and is located in nearly the same line and opposite to the projections *d d*, and is of nearly the same width as the straps *b b;* its object is to provide a bearing, in connection with the straps, against which the ends of the pipe-sections abut, as well as a gage whereby they will be aligned with each other.

*f* is a packing of any suitable material, which, under pressure, will be forced into or over the opening between the longitudinal edges of the thimble and seal the same. India-rubber, tarred paper, soft metals, (like lead,) or other equivalent materials may be used. When the packing is of material liable to crumble or wrinkle under the action of the key or wedge a piece of thin metal may be placed between the key and the packing, in which case the key, as it is driven in, will slide upon the thin metal without materially disturbing the packing beneath it.

C C represent the ends of pipe-sections coupled by an expansible thimble.

In applying the thimble, its longitudinal edges are brought close together and its ends are inserted into the ends of the pipe-sections until the ends of the pipe abut against the straps and the projecting piece *e*. The key or wedge B, with the packing *f* in place, is driven in between the projections *d d*, by which they are forced apart and the thimble expanded to the extent desired.

It will be seen that in all cases where the thimble and the pipe are of sufficient strength and rigidity to stand the expanding force without breaking or crippling, the wall of the thimble can be forced outwardly against the inner wall of the pipe almost without limit, and pipe-sections can thus be expeditiously, cheaply, and securely coupled together.

While it is not claimed that this kind of coupling will produce an absolutely tight joint for all purposes, it can, however, be used to great advantage to produce a strong and unyielding union between pipe-sections, so that any jars or strains to which the pipe may be subjected will be far less liable to loosen the sealing material used than when the common modes are applied. In connection with the ordinary sealing cements or packing the joints can be made absolutely tight and can be maintained in that condition.

I am aware that an expansible coupling is described and shown in Letters Patent No. 95,921, granted October 19, 1869, in which plates carrying projections for securing the key or wedge are attached to the internal wall or surface of the thimble. In this patented construction both the thimble and the pipe-sections are provided with corresponding beads, and the thimble is provided with a central bead, from which it is evident that this construction is limited to couplings and pipe made of thin or sheet metal.

My invention is adapted to pipe and couplings of such thickness of metal that beads could not be practically formed in it, and is especially designed for pipe and tubes to be used for hydraulic and similar purposes, but can also be applied to thin sheet metal.

What is claimed as new is—

1. In combination with straps $b\ b$, attached to the outer surface of a coupling thimble or ring and provided with projections $d\ d$, a projecting piece, $c$, of substantially the same width as the straps, as an aligning-gage for the pipe-sections, substantially as set forth.

2. In combination with a pipe-coupling thimble or ring expanded by a key or wedge, a packing interposed between the key or wedge and the wall of the thimble, whereby the joint or opening between the longitudinal edges of the thimble is sealed, substantially as set forth.

JOHN B. ROOT.

Witnesses:
ROBT. H. DUNCAN,
BENJ. A. SMITH.